US007821985B2

(12) United States Patent
Van Megen et al.

(10) Patent No.: US 7,821,985 B2
(45) Date of Patent: Oct. 26, 2010

(54) NETWORK INTERFACE ROUTING USING COMPUTATIONAL CONTEXT

(75) Inventors: Friedrich Van Megen, Aachen (DE); Ivo W. Salmre, Aachen (DE); Wolfgang Manousek, Dormagen (DE)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 11/373,954

(22) Filed: Mar. 13, 2006

(65) Prior Publication Data

US 2007/0211690 A1 Sep. 13, 2007

(51) Int. Cl.
*H04W 4/00* (2009.01)
*G06F 15/16* (2006.01)

(52) U.S. Cl. ........................ 370/328; 370/335; 370/338; 709/232; 709/245; 709/246

(58) Field of Classification Search ................. 370/351; 709/107, 102, 100, 5, 10
See application file for complete search history.

(56) References Cited

U.S. PATENT DOCUMENTS

| | | | |
|---|---|---|---|
| 6,272,518 B1 * | 8/2001 | Blazo et al. ................. | 718/102 |
| 6,311,186 B1 * | 10/2001 | MeLampy et al. ............ | 707/10 |
| 6,449,657 B2 * | 9/2002 | Stanbach et al. ............ | 709/245 |
| 2002/0120665 A1 * | 8/2002 | Alford et al. ................ | 709/107 |
| 2004/0203664 A1 | 10/2004 | Lei | |
| 2005/0055463 A1 * | 3/2005 | Saunders et al. ............ | 709/246 |
| 2006/0015636 A1 * | 1/2006 | Skraba et al. ............... | 709/232 |
| 2006/0080663 A1 * | 4/2006 | Pospiech .................... | 718/100 |

OTHER PUBLICATIONS

Dr. C.K.Shene, "Multithreaded Programming with ThreadMentor: A Tutorial", Sep. 28, 2005, section "Thread Management".*
M Veeraraghavan, et al., "Application aware routing protocol",computers and communications, 1997, proceedings, second IEEE symposium on, Jul. 1-3, 1997 pp. 442-448.
Schilit, B.N, et al., "Context-aware communication", wireless communications, IEEE, vol. 9, Issue 5, Oct. 2002 pp. 46-54.
International Search Report, Application No. PCT/US2007/003514. Dated Jul. 9, 2007. (11 Pages).

* cited by examiner

*Primary Examiner*—Melanie Jagannathan (57) ABSTRACT

Knowledge of the computational context of a computer operating environment, for example, awareness of process threads, is used to route IP traffic in the presence of multiple active network connections. An additional protocol may be added to the network layer of an operating system in order to map certain computational contexts to particular network interfaces. Any process with identification parameters associated with a mapped computational context requesting data transfer via a communication network is bound to the network interface previously associated with the computational context rather than an alternate network interface that otherwise might be the default. Further, process threads created by a parent process thread may be caused to inherit the computational context of the parent thread in order to assign traffic to the same network interface. This routing framework may have particular application with respect to multihomed host devices, for example, mobile computing devices.

20 Claims, 7 Drawing Sheets

NETWORK INTERFACE ROUTING USING COMPUTATIONAL CONTEXT

BACKGROUND OF THE INVENTION

Multihomed host devices, i.e., devices with more than one connection to a network, such as mobile computing devices, do not have the ability to implicitly and dynamically select the network link used for a particular remote data exchange or when the context of the computing environment meets certain conditions. Generally, all traffic is routed via a default connection set by the user in a preferences selection, or is sent by the particular network connection available at the time if other connections are unavailable. Unfortunately, the default network connection may not be the best use of available network resources or may not be in the best interest of the user at the particular time. For example, there may be widely different data transfer rates between available networks and the default selection of a lower bandwidth connection may unduly increase download time or tie up processor capacity. Further, different connection options may have different usage fees and the default network connection may not be the best value to the user at the time.

SUMMARY

Knowledge of the computational context of a computer operating environment, for example, awareness of process threads, is used to route IP traffic in the presence of multiple active connections. An additional application protocol interface (API) may be added to the network layer of an operating system in order to map certain computational contexts to particular network interfaces. Any process with identification parameters associated with a mapped computational context requesting data transfer via a communication network is bound to the network interface previously associated with the computational context rather than an alternate network interface that otherwise might be the default. Further, process threads created by a parent process thread may be caused to inherit the computational context of the parent thread in order to assign traffic to the same network interface. This routing framework may have particular application with respect to multihomed host devices, for example, mobile computing devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION OF THE INVENTION

In modern computing devices and especially with respect to mobile computing devices it is common for the computing device to utilize a number of network interfaces at the same time. For example, a "smart phone" may support communication interfaces for Bluetooth (a short range wireless connection standard), wireless local area networks (WLAN or Wi-Fi), and General Packet Radio Service (GPRS)/Universal Mobile Telecommunications System (UMTS)(packet-switched protocols for transmission and reception of data over a radio spectrum). While GPRS is available almost always, Wi-Fi connections are typically only available when the mobile device is within range of a Wi-Fi network, for example, a home wireless network, a workplace wireless network, or a public or semi-public wireless network (e.g., available at a coffee shop or hotel for patrons of the business). These network interfaces may have very different characteristics in terms of cost, security, and bandwidth.

Because the cost to transfer data over a Wi-Fi connection is generally negligible compared to the cost per data unit (e.g., per megabyte (MB)) transferred over a GPRS connection, it may be desirable to use a Wi-Fi interface whenever possible. The same preference may be true with respect to the available bandwidth, which in general is much larger on a Wi-Fi network compared to a GPRS connection.

There are, however, reasons why it may be preferable for an application to preferably select a slower or more expensive network connection when more than one network interface is available. For example, certain networks may offer access to specific servers and services only available on that network. Depending on the specific needs of the user or application running on the computing device, different network connections may be best to reach them. In such circumstances, it may be valuable to select a network interface link for a specific communication task based upon the present computational context.

When the term "network link" or "link" is used herein, it generally refers to a connection between peers directly connected via a particular hardware communication device or "network interface." For example, all computers that are connected to the same Ethernet segment (e.g., a switch or a hub) are on the same network link. In another example, all devices connected with a Wi-Fi card to the same wireless access point are using the same network link. In a further example, when a user uses a dial-up connection to reach an Internet service provider (ISP) via a modem on the user's computer, there are exactly two nodes (the user's computer and the ISP's Modem) connected to the same network link, i.e., the modem on the user's computer. Routing protocols are used by nodes to decide which network link to use to send a packet for a destination node next (i.e., the nodes decide which network link will be used to get "closer" to the destination node).

When the term "network connection" is used herein, it is generally used to describe a logical connection between two nodes that are not necessarily connected to the same network link. This is the common case for the Internet. A network connection implies that standard Internet protocols (IP) are used to exchange data between nodes.

When the term "network socket" or "socket" is used herein, it is generally used to describe the endpoint of a network connection. To setup a network connection, both nodes create a network socket, associate (i.e., "connect") the sockets to establish a network connection, and use IP protocols to exchange data through that connection. In this context then, a network link may be thought of as "lower" than a network socket or network connection in the sense that a network link only provides access to nodes connected directly with a particular hardware communication device (i.e., the network interface), while a network connection and associated network sockets allow access to nodes that are reachable by traversing a set of nodes that are connected via multiple network links.

By "computational context" it is meant that a selection of the network link interface may be dynamically made using preferences specifically identified by a particular application or by the user of the computing device instead of merely selecting the active default network link or utilizing the existing routing table. In the parlance of application programming, the network routing selection would thus be made based upon the particular "thread" of the program executing. Threads are a way for a program to split itself into two or more simultaneously running tasks, by analogy with the way that a number of threads are interwoven to make a piece of fabric. Multiple threads can be executed in parallel on many computer systems. This multithreading generally occurs by time slicing (where a single processor switches between different threads) or by multiprocessing (where threads are executed on separate processors). Further, a processor may simultaneously process threads from multiple applications contemporaneously executing.

Figure 1:
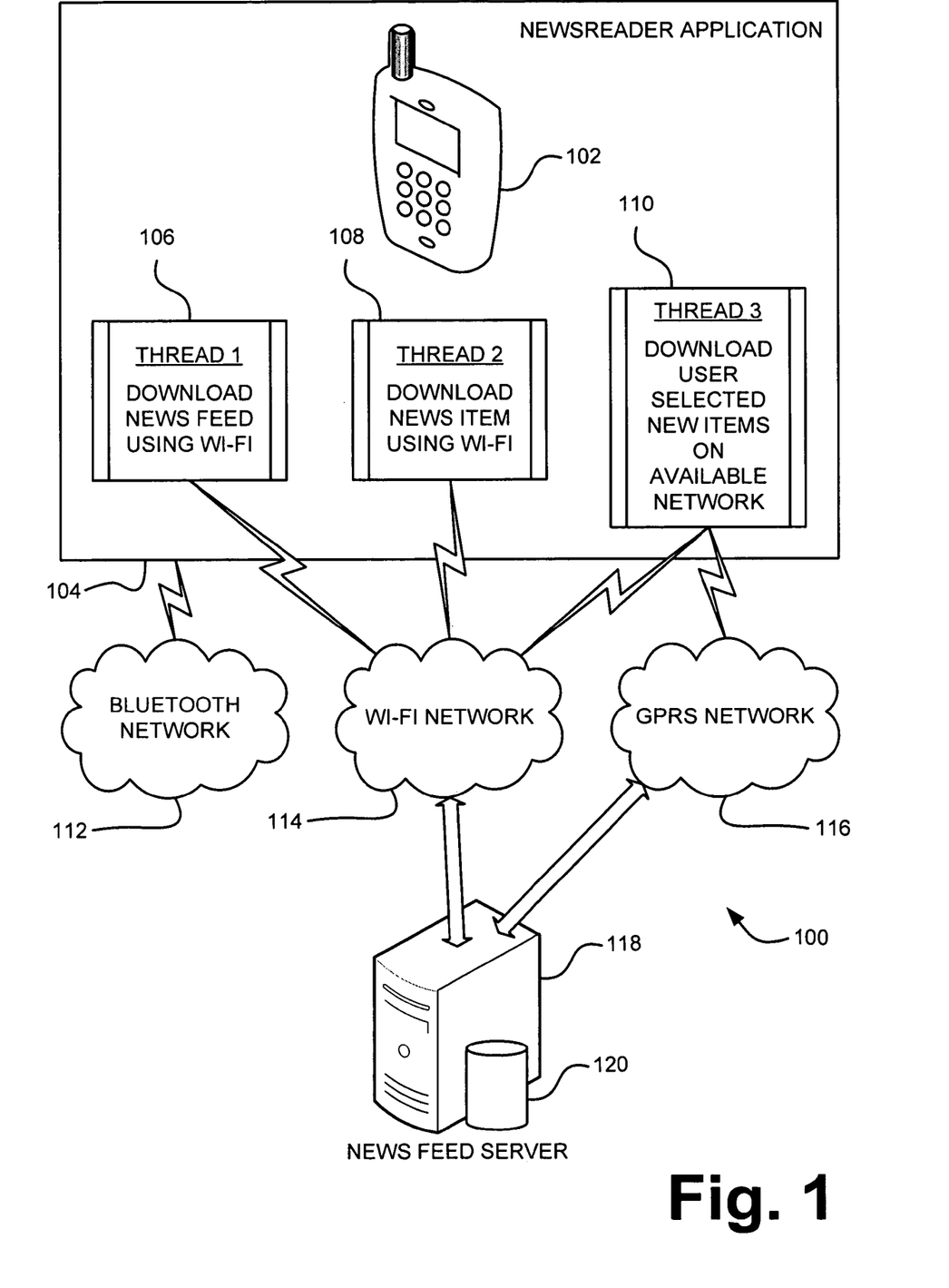
FIG. 1 is a schematic diagram of a computer network employing a routing function based on a computational context framework as described herein.

FIG. 1 provides an example of how an application may be developed to effect network interface selections based on computational context, i.e., the particular thread executed. In this example a "Newsreader" application 104 is developed for use on a mobile computing device 102 that is a connected with a distributed network computing system 100, e.g., the Internet. The mobile device 102 may be equipped with several different communication network interfaces. For example, the mobile device 102 may have a short range Bluetooth network interface 112 for communicating with peripheral devices such as a wireless headset or for synching information with a desktop computer. The mobile device 102 may also have a Wi-Fi network interface 114 for high speed data transfer when in range of a wireless access point. The mobile device 102 may further have a GPRS network interface 116 for data communication over a much larger geographic area, potentially coextensive with the coverage area for voice communication services of the telephone components of the mobile device 102.

The Newsreader application 104 may be designed to update a list of available news items every morning and to download the full news articles only when a Wi-Fi connection is available or if the user explicitly indicates a willingness to spend the extra money for downloading the articles via GPRS. A library 120 on a network server 118 from which the news feed and articles are downloaded is accessible by the mobile device either the Wi-Fi network interface or the GPRS network interface. However, the software controlling the library 120 is written by a third party and the developers of the Newsreader application 104 have no access to the source code controlling the library 120 or the network server 118 to indicate which network the new feed or articles should be transmitted over.

In order to effect an appropriate network selection based upon context, the developers of the Newsreader application 104 may program separate executable threads within the Newsreader application 104 to achieve the desired goals of the program. For example, a first programmatic thread 106 may be written to periodically download the news feed. In this example, the user may set a temporal component of the Newsreader application 104 indicating the newsfeed download should be performed each morning. Further, the default network for the Newsreader application 104 may be set to Wi-Fi to take advantage of lower cost and greater download speeds. The Newsreader application 104 may this be designed to monitor the available networking interfaces and trigger the actual connection to the third party library 120 only when the device is connected by Wi-Fi within the time window set by the user.

In a second exemplary programming thread 108, the developer of the Newsreader application 104 may set a default to download actual news articles as a background operation once such articles are available from the library 120 and only while in range of a Wi-Fi connection 114. Also, in a third exemplary programming thread 110 the Newsreader application 104 may be configured to download only news articles that are selected by the user.

For many mobile device operating systems (for example, WINDOWS CE), there is an extension to the IP networking layer that allows transport layer drivers to explicitly bind or assign a socket (i.e., a logical abstraction for a network connection) to a physical network interface (e.g., Wi-Fi, GPRS/UMTS, LAN, Bluetooth), thus, sending all traffic generated by that socket explicitly through the bound interface. This operating system function may be exploited by the developer of applications for mobile devices or other computing devices with multiple network interface options. However, such socket binding functionality may not be expected from third party applications, for example, the news article library 120 of FIG. 1, that may be used to serve the communication requirements of applications on the mobile device.

Even with multiple active network interfaces and the ability to bind sockets to a network interface, without some additional functionality, the Newsreader application 104 described above cannot be implemented. This is because the developer has neither control over the third party library (to pass a parameter selecting a specific interface) nor can the developer configure the networking layer to automatically route traffic from the network server 118 hosting the library 120 to a specific network interface. Further, network protocols will route all packet traffic generated by or for a particular application using the default network initially selected for communication traffic by the device or the particular application.

The goal of the developer of the Newsreader application 104 is to have all network traffic generated by the first thread 106 and the second thread 108 to go through the Wi-Fi network route. Additionally, the developer wants the Newsreader application 104 to decide the route for explicitly selected news articles according to the third thread 110. The Newsreader application 104 should be able to dynamically select whether the traffic should go either through the Wi-Fi connection or the GPRS connection.

In order to achieve these goals, a mapping table may be introduced to map computational contexts (e.g., threads or other parameters) to interfaces in the networking layer of an operating system. This mapping table contains an identifier corresponding to the physical network interface for each monitored computational context (e.g., program thread) through which outgoing traffic should be routed. The routing code in the networking layer honors the selected physical network interface even in cases where the connection to the interface is "lost" (e.g., packets are dropped because the configured interface is not available).

Rather than requiring a binding to a particular socket for each thread used for network connectivity in advance, as a default the prior configuration (e.g., of a parent thread) is inhered or assumed by any new computational context created by a running computational context. Thus, a new programmatic thread inherits the preferences of its parent thread by default. In this manner, for each process scenario only the first (main) thread has to be assigned to a physical network interface while subsequently created threads are assigned to the same interface automatically unless otherwise explicitly configured.

With this framework, the developer can thus implement the Newsreader application to select a network interface contextually. Upon instantiation of the application, the first thread 106 may be explicitly bound to the to the Wi-Fi interface. This is possible in the networking layer of a mobile operating system even if the wireless link has not been assigned an IP address. This explicit binding ensures that under no circumstances will the Newsreader application 104 generate unwanted costs for the user by choosing a more expensive network connection or defaulting to a connection presently in use by the mobile device for other communication traffic.

Once a Wi-Fi connection is initiated between the mobile device 102 and the network server 118 distributing the third party library 120, the application may spawn the first thread 106 as a background thread (i.e., a new computational context) to periodically retrieve the list of available news items. In this example the new thread inherits the networking interface criteria of the main thread. Thus, there is no additional work required by the application to make sure IP packets are routed correctly. Note that existing network-using components do not need to be rewritten to benefit from this solution because contextual network properties of a parent thread calling another component may simply be adhered to the child thread component upon instantiation.

Once a new list of news items is available, the first thread 106 spawns the second thread 108 to handle the queued list of pending news messages. Again, there is no additional work for the Newsreader application 104 as the settings from the first thread 106 are propagated to the new computational context of the second thread 108.

When a user clicks in the application's user interface on a news item that has not yet been downloaded by the second thread 108, the Newsreader application 104 questions the user if he is willing to pay the additional cost for immediate transmission over GPRS. If the user accepts these costs, the Newsreader application 104 creates the third thread 110, but then modifies the networking interface binding for the third thread 110 to lock it to the GPRS connection.

Implementation of this concept of contextual selection and binding of network interfaces as described above with respect to the exemplary scenario of FIG. 1 may be divided into two problems. A first problem concerns how to route all traffic originated by a specific networking connection to a specified networking interface. A second problem concerns how to bind networking connections created from within a computational context (e.g., a particular program thread) to a specific networking interface.

Figure 2:
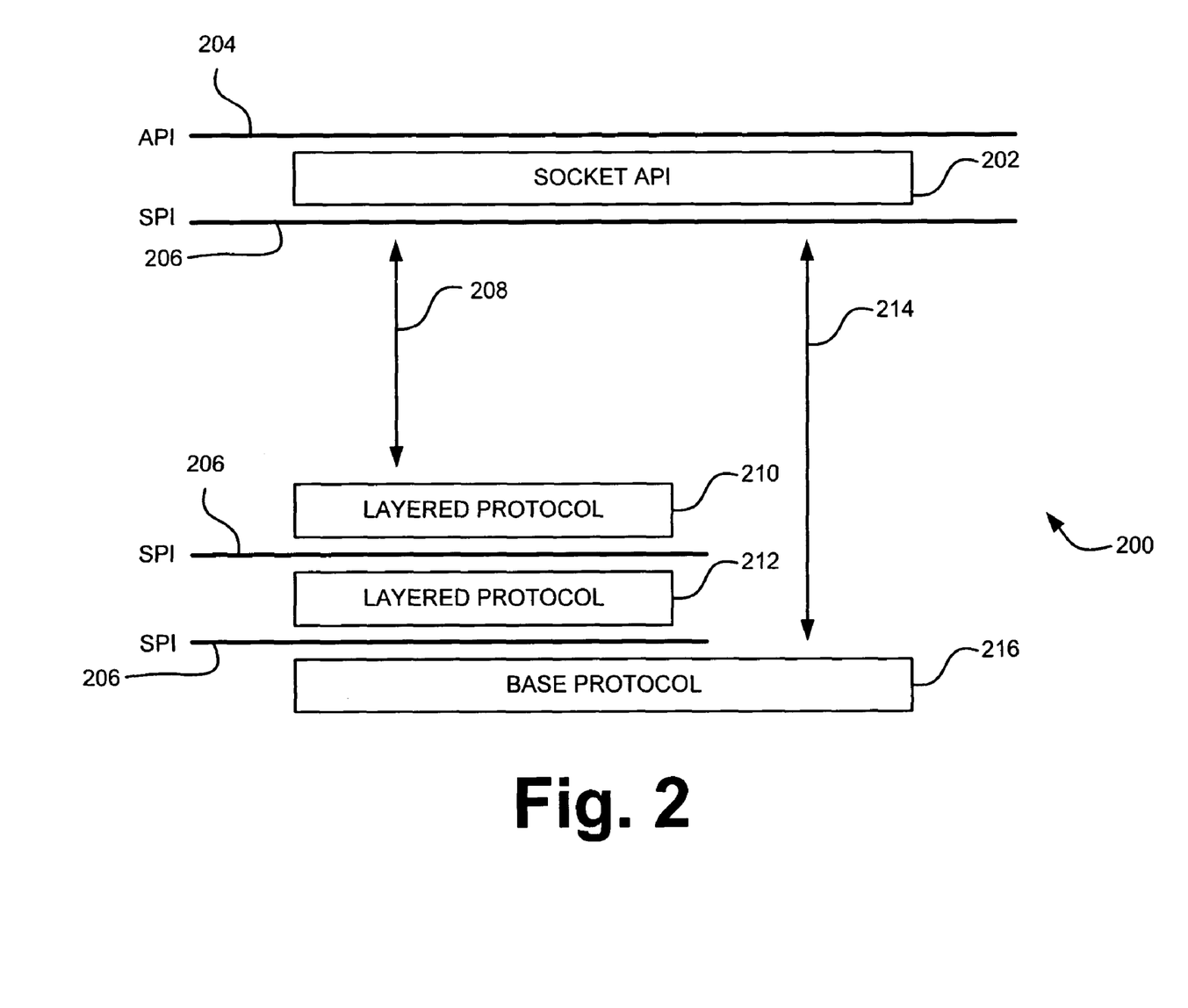
FIG. 2 is a schematic diagram of one implementation of a network interface routing framework as described herein.

One possible solution to the first problem uses one or more layered protocol drivers 210, 212 as represented in the implementation 200 depicted in FIG. 2. The application protocol interface (API) 204 that is accessed by an application to interface with the networking functions of an operating system. In particular, a socket API 204, for example, the Windows Sockets API WinSock used by most Internet and network applications to handle network connections, may be called. The layered protocol drivers 210, 212 map threads to physical network interfaces while depending on the underlying base protocol 216, which is assumed to support the explicit binding of a socket to a physical interface.

The layered protocol drivers 210, 212 have two responsibilities. A first responsibility represented by the first layered protocol driver 210 is to expose an interface to the application to manipulate a mapping table to translate from computational context (e.g., a particular program thread) to the networking interface. Using this layer, an application can modify its bindings.

A second responsibility represented by the second layered protocol driver 212 is to intercepts calls through the transport layer service provider interface (SPI) 206 connecting sockets. The second layered protocol driver 212 monitors explicit bind requests to specific network interfaces so that the layered protocol drivers 210, 212 do not interfere with sockets that are bound on purpose. Upon the identification of an unbounded socket, the second layered protocol driver 212 explicitly binds the socket to the network interface indicated by the mapping table based upon the computational context (if such contextual attributes are set), and the attributes of the socket are modified to route originating packets through the selected physical network interface.

Thus, for sockets without explicit network bindings, as indicated by communication arrow 208 between the socket API and the first layered protocol driver 210, the second layered protocol driver 212 applies bindings associated with the current computational context (e.g., thread). However, the second layered protocol driver 212 does not interfere with existing explicit socket bindings to network connections as indicated by communication arrow 214 between the socket API 204 and the base protocol 216.

Figure 3:
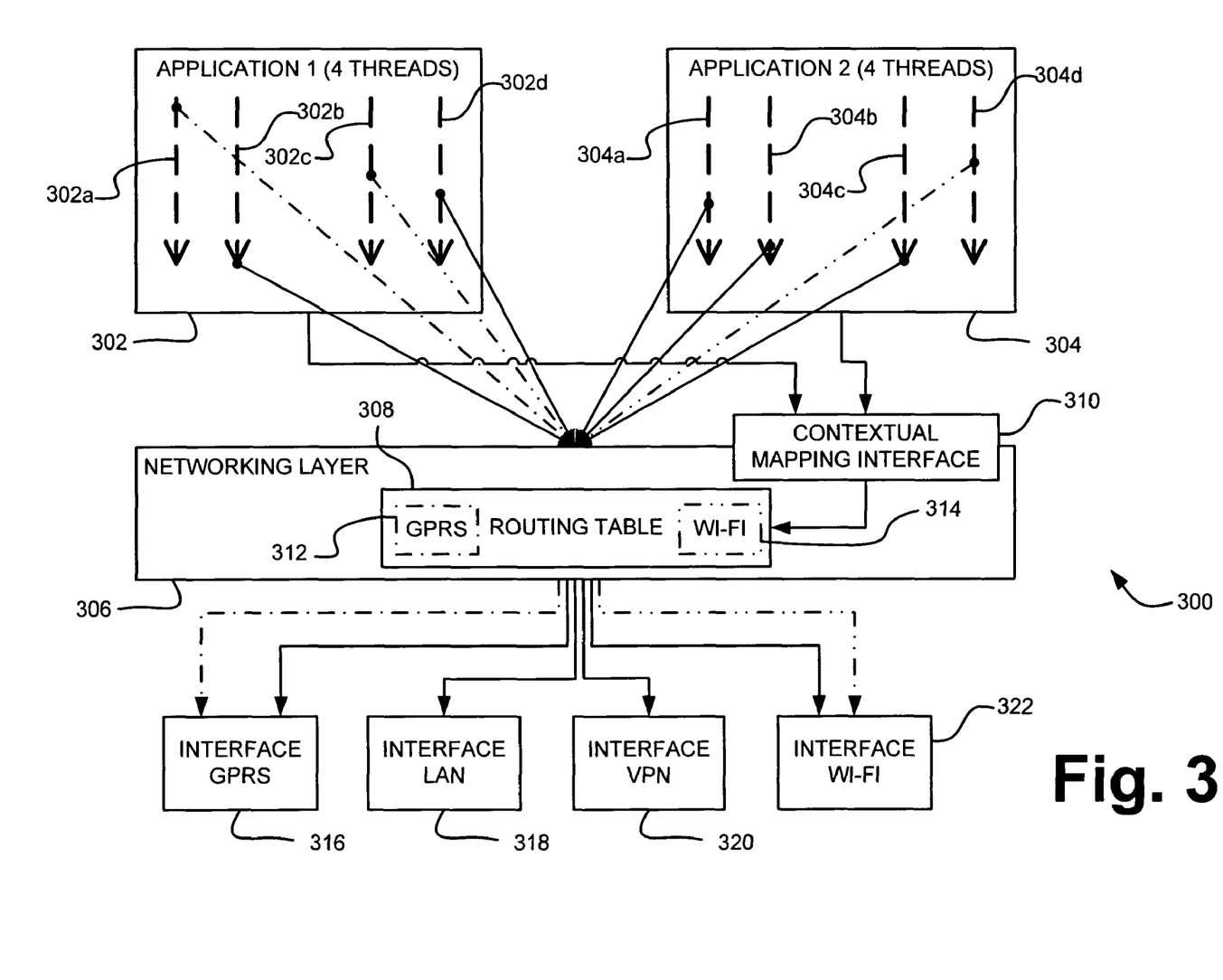
FIG. 3 is a schematic diagram of another implementation of a network interface routing framework as described herein.

Recall the second problem of binding networking sockets created from within a computational context to a specific networking interface. Another implementation for routing traffic addresses this problem by modifying the routing subsystem 300 by adding application specific routing properties directly to the existing routing table 308 as depicted in FIG. 3. The routing subsystem 300 may be provided with an additional contextual mapping interface 310 that allows manipulation of the networking protocol layer 306 to route based upon any computational context (e.g., thread) belonging to a particular process.

Sockets are in general automatically or implicitly connected to a networking interface when a "connect( )" operation is performed or explicitly connected by the programmer using a "bind( )" operation. The task is to make the implicit binding configurable by associating a computational context with a networking interface in the mapping or routing table 308 and have the implicit binding code of the networking layer 306 honor this routing table 308. Operations that ordinarily connect a networking socket to a networking interface 316, 318, 320, 322 are intercepted by the contextual mapping interface 310, enabling the application developer to create a mapping regime from computational context (e.g., a thread identification) to a particular networking interface 316, 318, 320, 322.

FIG. 3 shows, in part, how networking traffic, generated by different threads from a single process are normally handled. Two exemplary applications 302, 304 are depicted as each executing four threads 302a-d, 304a-d in parallel. During the lifetime of each thread, traffic is generated that needs to be communicated to a remote site. Threads 302b, 302d, 304a, 304b, 304c contain no contextual information while threads 302a, 302c, 304d do include contextual information. Further, the context of thread 302a indicates that information resulting from this process should be transmitted via the GPRS interface 316 as opposed to another interface. This is indicated in FIG. 3 by the dashed line with a single dot between the thread 302a and the networking layer 306. The context of thread 302a indicates that information resulting from this process should be transmitted via the GPRS interface 316 as opposed to another interface. This is indicated in FIG. 3 by the dashed line with two dots between the thread 302c, 304d and the networking layer 306.

Without contextual mapping, all of this traffic would normally pass through the networking layer 306 using its existing interfaces (e.g., creating a socket, establishing a connection to a remote site, and eventually sending data over the connection). This traffic is represented by the solid arrows from the threads 302b, 302d, 304a, 304b, 304c to the networking layer 306 and the solid arrows from the networking layer 306 to each of the network interfaces 316, 318, 320, 322. The specific interface selected by the networking layer 306 is merely the default interface at the time, for example, whichever interface is in range of or connected to the device or chosen as the default by the user. What happens within the networking layer 306 is transparent to the applications 302, 304, but eventually each piece of information is passed to a physical network interface 316, 318, 320, 322 for transmission.

The normal interface configuration results in the routing table 308 having a default route for each active networking interface 316, 318, 320, 322. Note that a complete set of IP parameters for each network interface 316, 318, 320, 322 is available after the network interface has been initialized. This information is in the form of an IP address, a network mask, and a default gateway for the network interface and is either hard coded by the administrator of the local machine or set during configuration from data returned by a Dynamic Host Configuration Protocol (DHCP) server automatically assigning a configuration.

However, there is no standardization in the routing table actually binds data from sockets to a particular network interface. Where there is one default route entry per network interface, outgoing traffic not targeted for a directly connected network (i.e., traffic processed by the default routing table) can be handled in a number of ways. Such traffic may be sent to the gateway on the network interface to which the socket is bound; sent to the gateway on the network interface to which the default route is attached; or sent to any of the available network interfaces, often actually switching the actual gateway used (e.g., like WINDOWS 2000).

However, as in the example of the Newsreader application described with respect to FIG. 1, with the advent of mobile devices, the standard networking protocols may not be flexible enough. Some applications may need a finer grain of control of the networking interface through which information should be routed for reasons including performance, security, and availability. Thus, in FIG. 3 the routing table 308 has been made accessible by adding an additional contextual mapping interface 310 to the networking layer 306. The contextual mapping interface 310 allows a programmer to set up a route mapping from a particular thread, for example, based on a thread identification, to a physical network interface based upon an interface identifier.

As shown in FIG. 3 each of the first application 302 and the second application 304 provide contextual mapping information to the contextual mapping interface 310. The contextual mapping interface 310 uses the contextual information from the first and second applications 320, 304 to add additional contextual routing criteria 312, 314 based upon computational contexts to the routing table 308. The contextual routing criteria 312, 314 may take the form of a binding instruction relating a particular thread identification to a particular network interface identified by the IP parameters of the network interface. For any packet that needs to be routed, a lookup is performed by the routing table 308. If the packet includes contextual information corresponding to contextual routing criteria 312, 314, a socket is created (or selected if already created), an attempt to connect to a remote host is initiated, and the packet is transmitted over the configured network interface. Otherwise, the packet is routed using the normal routing table.

For example, with respect to the exemplary Newsreader application of FIG. 1, the contextual mapping interface 310 may write a GPRS field 312 and a Wi-Fi field 314 to the routing table 308 upon instruction by the applications 302, 304. When the thread 302a from the first application 302 with thread identification information corresponding to a GPRS network interface selection (indicated in FIG. 3 as a dashed line with a single dot between dash pairs) is received at the network layer 306, a socket is created based upon the GPRS field 312 of the routing table 308 and bound directly to the GPRS network interface 316. Likewise, when either the thread 302c from the first application 302 or thread 304d from the second application 304 with thread identification information corresponding to a Wi-Fi network interface selection (indicated in FIG. 3 as a dashed line with two dots between dash pairs) is received at the network layer 306, a socket is created based upon the Wi-Fi field 314 of the routing table 308 and bound directly to the Wi-Fi network interface 322.

Enabling the binding of a socket based upon computational context thus allows applications to control through which networking interface traffic is routed by simply binding their networking socket to one of the available interfaces without interfering with traditional routing. Adding control to enable implicit binding within the core networking layer of a communications socket to a network interface directly through the routing table allows the networking layer to also route packets that are not related to a Transport Control Protocol (TCP) or User Datagram Protocol (UDP) connection, for example, Internet Control Message Protocol (ICMP) and key exchange packets generated by a monitored computational context.

Figure 4:
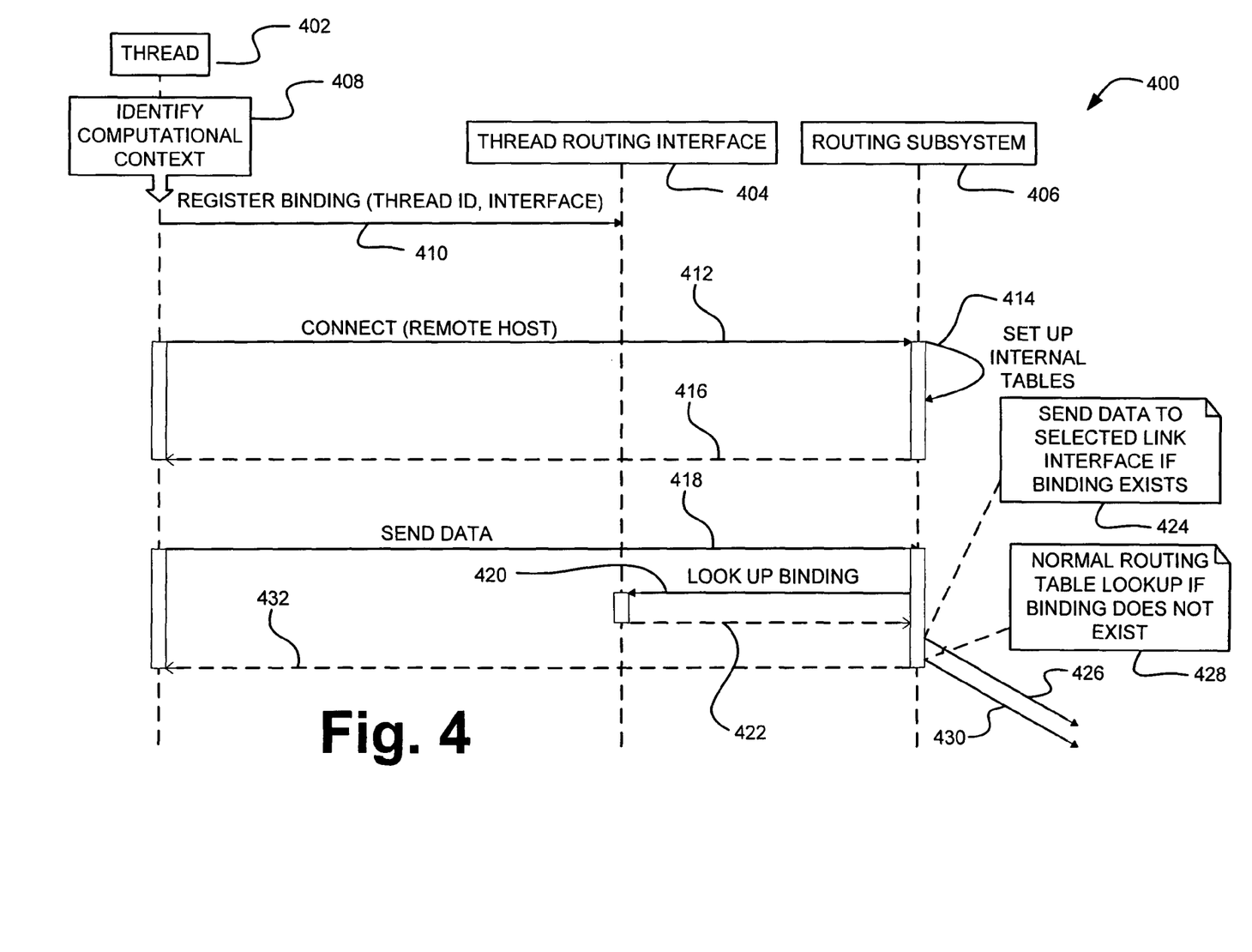
FIG. 4 is a schematic diagram of a process for assigning a network interface to an application thread based upon a computational context.

FIG. 4 schematically represents a binding event 400 based upon a computational context passed by an application to the networking layer. Three components are involved in the binding event 400: an application thread 402, a thread routing interface 404, and a routing subsystem 406 of the networking layer. The application thread 402 uses the routing capabilities added to the networking layer. The thread routing interface 404 is an extended API of the networking layer that is exposed as an extension to the existing network API. The routing subsystem 406 is part of the network API.

In an initial operation 408 of the binding event 400, the client application thread 402 collects the computational context that is relevant for the subsequent network operations. In general, the computational context may be any set of environmental properties, for example, thread identification, a transaction identification, a fiber identification (fibers being threads running on top of the operating system and not interacting with the kernel), a time or date stamp, present processor load, network cost differences, and others. Note that the set of possible computational contexts is entirely extendable. In the example of FIG. 4 however, the computational context comprises only a thread identifier.

In a registration operation 410, the thread 402 of the client application registers the acquired computational context with the thread routing interface API 404. In this example, the thread 402 from the client passes two parameters to the thread routing interface 404: the set of computational context properties and the network interface identifier through which to route all traffic that is generated in the given context. This will associate the computational context properties with the network interface, for example, an Ethernet cable or a WiFi connection. Note, there is no guarantee that traffic sent to a particular device over a communication network will always be replied to through the specific interface because it is up to the intermediate network to select one of the known addresses of the destination device when forwarding data to that device.

In a connection operation 412, the thread 402 of the client application generates network traffic to connect to a remote host by, for example, directly calling the routing subsystem 406 of the networking API (e.g., by sending socket, bind, connect, or other network interface commands). Alternatively, the thread 402 of the client application may call into a library (even a library for which no sources are available or for which the programmer has no right to change) that eventually calls into the networking API. The routing subsystem 406 then performs a set up operation 414 in which a socket is instantiated and bound to the identified network, the computational context is mapped to the given network link interface, and the information associated with the thread is stored in a table. Once the socket is created and connection is achieved with the remote host, notice 416 of the completed connection is returned to the thread 402.

When the thread 402 sends data to the remote host in a sending operation 418, the routing subsystem 406 of the network API performs an internal lookup operation 420 into the thread routing interface 404 API to determine whether one of the registered sets of computational contexts is currently valid. Binding information from the thread routing interface is returned 422 to the routing subsystem 406. If a related computational context is found, the data is sent 426 through the network interface (e.g., Ethernet, Wifi, etc.) registered for that context. The normal routing table lookup is bypassed for this data. If no computational context is valid at the time the data is to be sent, a normal lookup operation 428 through the existing routing table is performed and the packet is sent 430 through the link interface as returned by that lookup. Once the packet is sent, confirmation 432 is provided to the thread 402.

Figure 5:
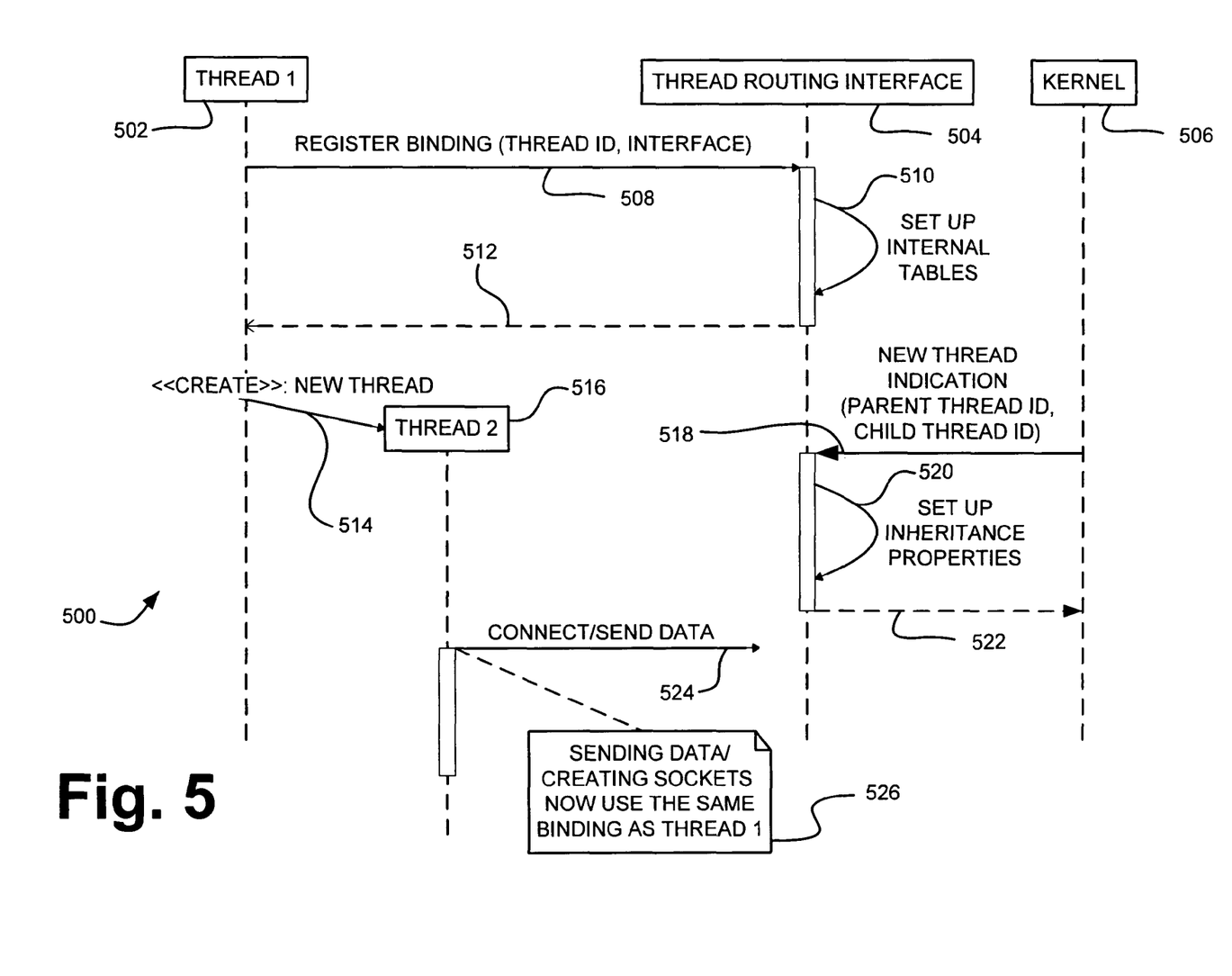
FIG. 5 is a schematic diagram of a process for assigning a network interface from one application thread to another application thread.

FIG. 5 shows the required support from the operating system for creating child threads with computational context information passed on from a parent thread. In some respects, FIG. 5 may be viewed as an extension of FIG. 4, describing how to handle automatic inheritance of computational context mappings. Recall in FIG. 4 that if no computational context matches at the time when data is to leave the client through the network, all data is routed with help of the normal routing table. However, the operating system may be configured to automatically generate a derived context from an existent computational context and send the data through the interface associated with the original context.

The example of FIG. 5 schematically represents a child thread creation event 500 based upon a computational context passed by an application to the networking layer. Three components are involved in the child thread creation event 500: an application thread 502, a thread routing interface 504, and the core kernel 506 of the operating system. The application thread 502 uses the routing capabilities added to the networking layer. The thread routing interface 504 is an extended API of the networking layer that is exposed as an extension to the existing network API. The core kernel 506 to operating system software is responsible for providing secure access to the computer hardware and to various computer processes.

In a registration operation 508, the parent thread 502 of the client application registers the acquired computational context with the thread routing interface 504 API. In this example, the parent thread 502 from the client passes two parameters to the thread routing interface 504: the set of computational context properties and the network interface identifier through which to route all traffic that is generated in the given context. This will associate the computational context properties with the network interface, for example, an Ethernet cable or a WiFi connection. The routing subsystem 504 then performs a set up operation 510 in which the computational context is mapped to the given network link interface and the information is stored in a table. Once the parameters are set up in the mapping table of the thread routing interface 504, notice 512 of the completed connection is returned to the parent thread 502.

Next, in a creation operation 514, the original parent thread 502 creates a new child thread 516, which begins performing additional processes in parallel with the parent thread 502. However, the computational context recorded for the parent thread 502 in the mapping table will not match the computational context of the child thread 516 because the thread identification assigned by the kernel 506 to the child thread 516 is unique to that particular process. In order to transfer the computational context properties of the parent thread 502 to the child thread 516, the kernel 506 needs to be modified such that notifications are sent to the thread routing interface 504 whenever a new thread is created.

Two parameters are passed to the thread routing interface 504: the thread identification parameters of the parent thread 502 and the thread identification parameters of the child thread 516. These parameters are passed in a passing operation 518 from the kernel 506 to the thread routing interface 504 to create an inheritance relationship. The thread routing interface 504 updates the mapping tables to identify the sockets and bound network interfaces of the parent thread 502 with the child thread 516. Once the mapping table of the thread routing interface 504 is updated, notice 522 of the completed operation is returned to the kernel 506.

Now when the child thread 516 sends data to the remote host in a sending operation 524, parameters of both the parent thread 502 and the child thread 516 may be passed to the routing subsystem of the network API. As described with respect to FIG. 4, the routing subsystem performs an internal lookup operation into the thread routing interface 504 API to determine whether one of the registered sets of computational contexts is currently valid. Binding information from the thread routing interface 504 is returned to the routing subsystem that identifies the child thread 516 as associated with the same socket and network interface as the parent thread 502. Thus the data is sent through the network interface registered for the context associated with both the parent thread 502 an the child thread 516 as indicated in the note 526 associated with the sending operation 524.

Figure 6:
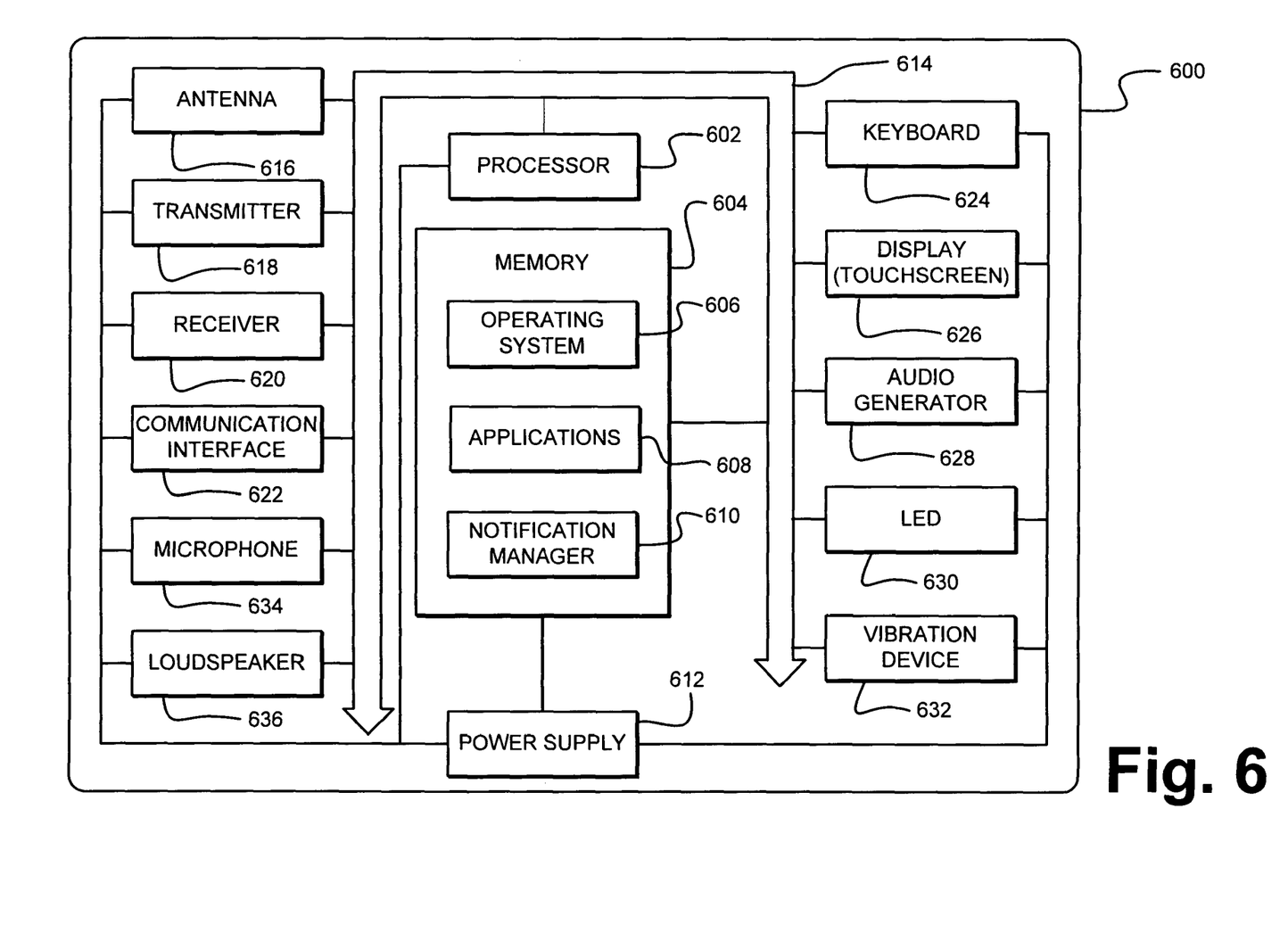
FIG. 6 is a schematic diagram of a general purpose mobile computing device that may be used in the implementation of a computational context routing system.

An exemplary mobile device 600 for use within the location-based caching system is depicted in FIG. 6. The mobile device 600 includes a processor 602 and memory 604 as in any standard computing device. The processor 602, memory 604, and other components hereinafter described may interface via a system bus 614. The system bus 614 may be any of several types of bus structures including a memory bus or memory controller, a peripheral bus, a switched fabric, point-to-point connections, and a local bus. The memory 604 generally includes both volatile memory (e.g., RAM) and non-volatile memory (e.g., ROM or a PCMCIA card). An operating system 606 may reside in the memory 604 and execute on the processor 602. An exemplary operating system may be the WINDOWS CE operating system from Microsoft Corporation.

One or more application programs 608 may be loaded into the memory 604 for execution by the processor 602 in conjunction with the operating system 606. Exemplary applications may include electronic mail programs, scheduling programs, personal information management programs, word processing programs, spreadsheet programs, Internet browser programs, music file management programs, and photograph and video file management programs. The memory 604 may further include a notification manager 610, which executes on the processor 602. The notification manager 610 handles notification requests from the applications 608 to one or more user notification devices as described in greater detail below.

The mobile device 600 also has a power supply 612, which may be implemented using one or more batteries. The power supply 612 may also be from an external AC source through the use of a power cord or a powered data transfer cable connected with the mobile device 600 that overrides or recharges the batteries. The power supply 612 is connected to most, if not all, of the components of the mobile device 600 in order for each of the components to operate.

In one embodiment, the mobile device 600 may include communications capabilities, for example, the mobile device 600 operates as a wireless telephone. A wireless device 600 with telephone capabilities generally includes an antenna 616, a transmitter 618, and a receiver 620 for interfacing with a wireless telephony network. Additionally, the mobile device 600 may include a microphone 634 and loudspeaker 636 in order for a user to telephonically communicate. The loudspeaker 636 may also be in the form of a wired or wireless output port for connection with a wired or wireless earphone or headphone.

The mobile device 600 may connect with numerous other networks, for example, a wireless LAN (Wi-Fi) network, a wired LAN or WAN, GPRS, Bluetooth, UMTS or any other network via one or more communication interfaces 622. The antenna 616 or multiple antennae may be used for different communication purposes, for example, radio frequency identification (RFID), microwave transmissions and receptions, Wi-Fi transmissions and receptions, and Bluetooth transmissions and receptions.

The mobile device 600 further generally includes some type of user interface. As shown in FIG. 6, the mobile device 600 may have a keyboard 624 and a display 626. The keyboard 624 may be a limited numeric pad, a full "qwerty" keyboard, or a combination of both. The keyboard 624 may also include specialty buttons, wheels, track balls, and other interface options, for example, menu selection or navigation keys or telephone function keys. In addition to depicting information, the display 626 may also be a touch screen display that allows for data entry by touching the display screen with the user's finger or a stylus to make input selections via a graphical interface or write letters and numbers directly on the display 626.

The mobile device 600 may also have one or more external notification mechanisms. In the embodiment depicted in FIG. 6, the mobile device 600 includes an audio generator 628, a light emitting diode (LED) 630, and a vibration device 632. These devices may be directly coupled to the power supply 612 so that when activated, they may remain energized for a duration dictated by the notification manager 610, even though the processor 602 and other components may shut down to conserve battery power.

Figure 7:
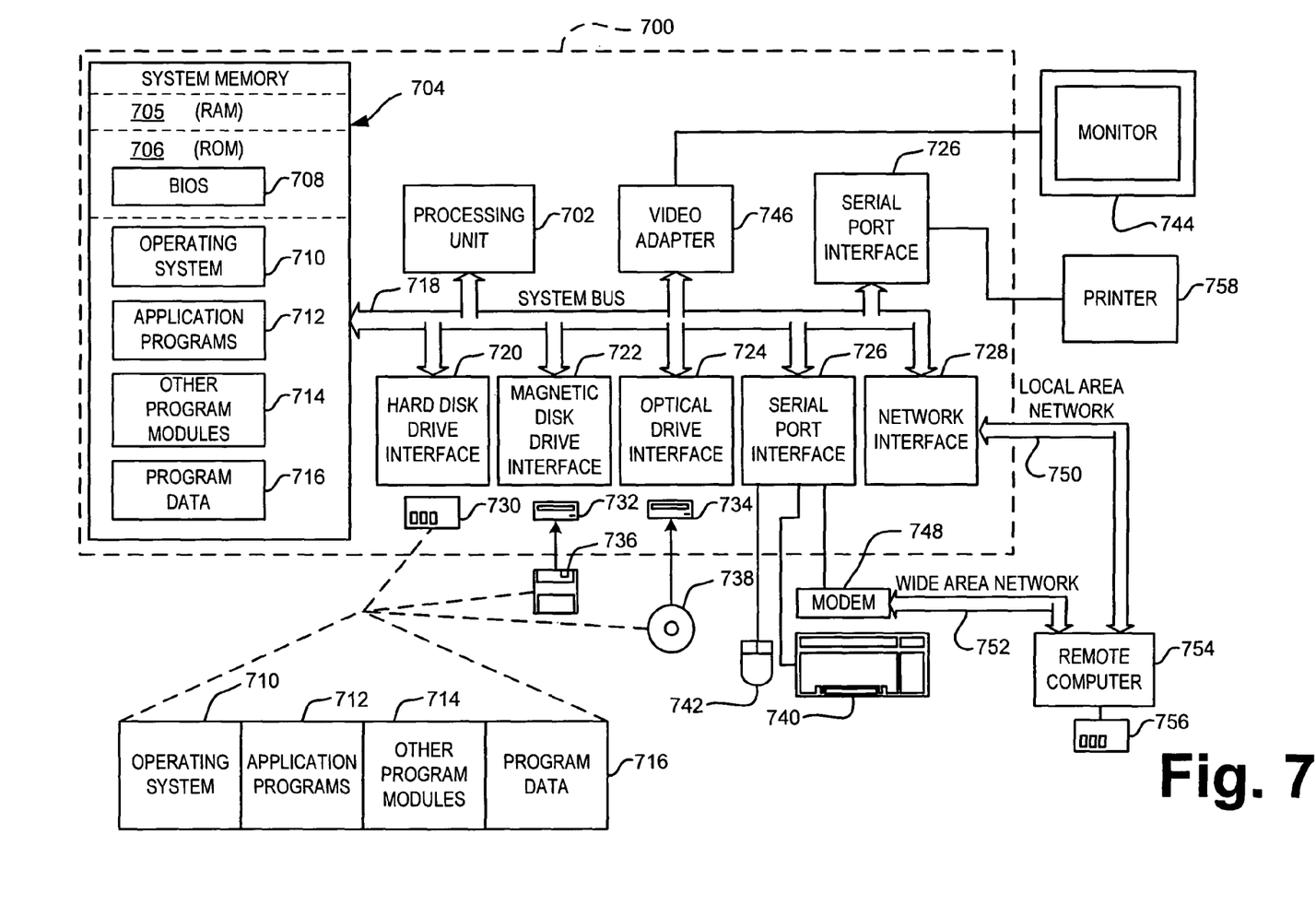
FIG. 7 is a schematic diagram of a general purpose computer system that may be used in the implementation of a computational context routing system.

An exemplary hardware and operating environment of FIG. 7 for implementing the invention includes a general purpose computing device in the form of a computer 700, including a processing unit 702, a system memory 704, and a system bus 718 that operatively couples various system components, including the system memory 704 to the processing unit 702. There may be only one or there may be more than one processing unit 702, such that the processor of computer 700 comprises a single central processing unit (CPU), or a plurality of processing units, commonly referred to as a parallel processing environment. The computer 700 may be a conventional computer, a network server, a distributed computer, or any other type of computer; the invention is not so limited.

The system bus 718 may be any of several types of bus structures including a memory bus or memory controller, a peripheral bus, a switched fabric, point-to-point connections, and a local bus using any of a variety of bus architectures. The system memory 704 may also be referred to as simply the memory, and includes read only memory (ROM) 706 and random access memory (RAM) 705. A basic input/output system (BIOS) 708, containing the basic routines that help to transfer information between elements within the computer 700, such as during start-up, is stored in ROM 706. The computer 700 further includes a hard disk drive 730 for reading from and writing to a hard disk, not shown, a magnetic disk drive 732 for reading from or writing to a removable magnetic disk 736, and an optical disk drive 734 for reading from or writing to a removable optical disk 738 such as a CD ROM or other optical media.

The hard disk drive 730, magnetic disk drive 732, and optical disk drive 734 are connected to the system bus 718 by a hard disk drive interface 720, a magnetic disk drive interface 722, and an optical disk drive interface 724, respectively. The drives and their associated computer-readable media provide nonvolatile storage of computer-readable instructions, data structures, program modules and other data for the computer 700. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 730, magnetic disk 732, optical disk 734, ROM 706, or RAM 705, including an operating system 710, one or more application programs 712, other program modules 714, and program data 716. A user may enter commands and information into the personal computer 700 through input devices such as a keyboard 740 and pointing device 742, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 702 through a serial port interface 726 that is coupled to the system bus 718, but may be connected by other interfaces, such as a parallel port, game port, or a universal serial bus (USB).

A monitor 744 or other type of display device is also connected to the system bus 718 via an interface, such as a video adapter 746. In addition to the monitor 744, computers typically include other peripheral output devices, such as a printer 758 and speakers (not shown). These and other output devices are often connected to the processing unit 702 through the serial port interface 726 that is coupled to the system bus 718, but may be connected by other interfaces, such as a parallel port, game port, or a universal serial bus (USB).

The computer 700 may operate in a networked environment using logical connections to one or more remote computers, such as remote computer 754. These logical connections may be achieved by a communication device coupled to or integral with the computer 700; the invention is not limited to a particular type of communications device. The remote computer 754 may be another computer (e.g., a mobile computing device), a server, a router, a network personal computer, a client, a peer device, or other common network node, and typically includes many or all of the elements described above relative to the computer 700, although only a memory storage device 756 has been illustrated in FIG. 7. The logical connections depicted in FIG. 7 include a local-area network (LAN) 750 and a wide-area network (WAN) 752. Such networking environments are commonplace in office networks, enterprise-wide computer networks, intranets and the Internet, which are all types of networks.

When used in a LAN 750 environment, the computer 700 may be connected to the local network 750 through a network interface or adapter 728, which is one type of communications device. When used in a WAN 752 environment, the computer 700 typically includes a modem 748, a network adapter, or any other type of communications device for establishing communications over the wide area network 752. The modem 748, which may be internal or external, is connected to the system bus 718 via the serial port interface 726. In a networked environment, program modules depicted relative to the personal computer 700, or portions thereof, may be stored in a remote memory storage device. It is appreciated that the network connections shown are exemplary and other means of and communications devices for establishing a communications link between the computers may be used.

In an exemplary implementation, the contextual routing interface may be incorporated as part of the operating system 710, application programs 712, or other program modules 714. State description files, object data values, and other data may be stored as program data 716.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independently of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for routing data to a physical communication network interface comprising:
    receiving a request to transmit data from an application executing a programmatic thread on a computing device having a plurality of physical communication network interfaces for transmitting the data over different communication networks, wherein the request is received at a network layer of the computing device that supports explicit socket bindings to specific physical communication network interfaces;
    monitoring the request at one or more layered protocol drivers implemented by the networking layer for an explicit socket binding to a specific physical communication network interface;
    upon determining that the request is without an explicit socket binding to a specific physical communication network interface, identifying a computational context that is associated with the data and relevant for subsequent network operations based on the executing programmatic thread;
    registering the computational context with a routing interface of the network layer exposed by the one or more layered protocol drivers, the computational context registered by the programmatic thread using a thread identification parameter of the programmatic thread;
    associating the computational context registered by the programmatic thread with a particular physical communication network interface in a mapping table of the routing interface;
    receiving the data to transmit from the programmatic thread; and
    routing the data to the particular physical communication network interface of the computing device for transmission over a communication network based upon the computational context registered by the programmatic thread with the routing interface.

2. The method of claim 1, further comprising transmitting the data via the particular physical communication network interface.

3. The method of claim 1, wherein the routing operation further comprises mapping the computational context to the particular network interface.

4. The method of claim 1, further comprising:
    instantiating a communication socket;
    associating the communication socket with the computational context; and
    binding the communication socket to the particular physical communication network interface.

5. The method of claim 1, wherein the computational context comprises an extensible set of computational contexts.

6. A computer-readable storage medium having computer-executable instructions performing a computer process implementing the method of claim 1.

7. A method for routing data in a computing device having a plurality of physical communication network interfaces for transmitting the data over different communication networks, the method comprising:
    registering computational contexts relevant for subsequent network operations with a routing interface of a network layer of the computing device, wherein:
        the network layer supports explicit socket bindings to specific physical communication network interfaces, the routing interface is exposed by one or more layered protocol drivers implemented by the network layer, and the computational contexts are identified based on programmatic threads executed by the computing device and registered by the programmatic threads using thread identification parameters;

associating particular computational contexts registered by the programmatic threads with particular physical communication network interfaces in a mapping table of the routing interface;

receiving a request to transmit data from a process thread executing on the computing device;

monitoring the request at the one or more layered protocol drivers implemented by the networking layer for an explicit socket binding to a specific physical communication network interface;

upon determining that the request is without an explicit socket binding to a specific physical communication network interface, identifying a computational context associated with the data based on the executing process thread; and making a routing decision for transmission of the data through one of the plurality of physical communication network interfaces of the computing device based upon the computational context associated with the data and the computational contexts registered by the one or more programmatic threads with the routing interface.

8. The method of claim 7 further comprising:

accessing the mapping table of the routing interface to determine the one of the plurality of physical communication network interfaces of the computing device for routing the transmission of the data.

9. The method of claim 7, wherein the computational context associated with the data comprises one or more of process thread identification, transaction identification, fiber identification, a time stamp, present processor load, and network cost difference.

10. The method of claim 7, wherein the process thread further creates a child process thread, and the method further comprises:

associating the computational context of the process thread with the child process thread; and making a routing decision for transmission of additional data generated by the child process thread through the one of the plurality of physical communication network interfaces based upon the computational context of the process thread.

11. The method of claim 7, wherein the computational context comprises an extensible set of computational contexts.

12. A computer-readable storage medium having computer-executable instructions performing a computer process implementing the method of claim 7.

13. A method of making network interface routing decisions in a computing device having multiple physical communication network interfaces for transmitting data over different communication networks, the method comprising:

receiving a request to transmit data from an application process executing on the computing device at a network layer of the computing device, the network layer supporting explicit socket bindings to specific physical communication network interfaces;

monitoring the request at one or more layered protocol drivers implemented by the networking layer for an explicit socket binding to a specific physical communication network interface;

upon determining that the request is without an explicit socket binding to a specific physical communication network interface, identifying a computational context that is associated with the data and relevant for subsequent network operations based on a parameter presented to the networking layer as part of the application process;

mapping the parameter to a particular physical communication network interface in a routing interface exposed by one or more layered protocol drivers implemented by the networking layer to create a mapped relationship;

registering the mapped relationship with the routing interface of the network layer by the application process using a thread identifier of the application process;

storing the mapped relationship in a mapping table of the routing interface for associating the computational context with the particular physical communication network interface;

associating the parameter with data sent from the application process for transmission;

comparing the parameter associated with the data to the mapped relationship registered by the programmatic thread with the routing interface; and routing the data to the particular physical communication network interface to which the parameter is mapped.

14. The method of claim 13 further comprising:

creating a communication socket;

associating the communication socket with the computational context; and binding the communication socket to the particular physical communication network interface.

15. The method of claim 13, further comprising:

bypassing an existing default routing table;

accessing the mapped relationship from the mapping table of the routing interface to determine whether the computational context identified by the parameter is valid;

returning binding information from the routing interface for sending the data associated with the parameter through the particular physical communication network interface when the computational context identified by the parameter is valid; and performing a routing table lookup through the existing default routing table when the computational context identified by the parameter is not valid.

16. The method of claim 13, wherein the computational context comprises one or more of process thread identification, transaction identification, fiber identification, a time stamp, present processor load, and network cost difference.

17. The method of claim 13, wherein the parameter comprises an extensible set of computational contexts.

18. The method of claim 13 further comprising creating a child application process from the application process; and inheriting the mapped relationship to the child application process, wherein the parameter is further associated with additional data sent from the child application process.

19. A computer-readable storage medium having computer-executable instructions performing a computer process implementing the method of claim 13.

20. The method of claim 1 further comprising receiving subsequent data associated with the computational context; and routing the subsequent data to the particular physical communication network interface based upon the computational context registered by the programmatic thread with the routing interface.

* * * * *